(12) United States Patent
Farres et al.

(10) Patent No.: US 10,525,956 B2
(45) Date of Patent: Jan. 7, 2020

(54) BRAKE ARRANGEMENT COMPRISING HYBRID BRAKE ACTUATORS

(71) Applicant: VOLVO TRUCK CORPORATION, Göteborg (SE)

(72) Inventors: Lionel Farres, Heyrieux (FR); Christophe Long, Brindas (FR)

(73) Assignee: VOLVO TRUCK CORPORATION, Göteborg (SE)

( * ) Notice: Subject to any disclaimer, the term of this patent is extended or adjusted under 35 U.S.C. 154(b) by 0 days.

(21) Appl. No.: 15/742,925

(22) PCT Filed: Jul. 27, 2015

(86) PCT No.: PCT/IB2015/001812
§ 371 (c)(1),
(2) Date: Jan. 9, 2018

(87) PCT Pub. No.: WO2017/017491
PCT Pub. Date: Feb. 2, 2017

(65) Prior Publication Data
US 2018/0362008 A1    Dec. 20, 2018

(51) Int. Cl.
| | | |
|---|---|---|
| *B60T 13/66* | (2006.01) |
| *B60T 13/58* | (2006.01) |
| *B60T 13/68* | (2006.01) |
| *B60T 13/74* | (2006.01) |
| *F16D 121/08* | (2012.01) |
| *F16D 121/24* | (2012.01) |

(52) U.S. Cl.
CPC .......... *B60T 13/662* (2013.01); *B60T 13/588* (2013.01); *B60T 13/683* (2013.01); *B60T 13/741* (2013.01); *F16D 2121/08* (2013.01); *F16D 2121/24* (2013.01)

(58) Field of Classification Search
CPC .... B60T 13/662; B60T 13/683; B60T 13/741; B60T 13/588; F16D 2121/08; F16D 2121/24
USPC ...... 303/3, 15, 20, 22.4, 89, 191; 701/70, 78
See application file for complete search history.

(56) References Cited

U.S. PATENT DOCUMENTS

| | | | | |
|---|---|---|---|---|
| 5,443,306 A | * | 8/1995 | Broome | B60T 8/327 303/113.4 |
| 8,702,179 B2 | * | 4/2014 | Beier | B60T 13/741 180/281 |
| 9,022,488 B2 | | 5/2015 | Beier et al. | |

(Continued)

FOREIGN PATENT DOCUMENTS

| | | |
|---|---|---|
| WO | 03014588 A1 | 2/2003 |
| WO | 2008030204 A1 | 3/2008 |

(Continued)

OTHER PUBLICATIONS

International Search Report (dated Mar. 30, 2016) for corresponding International App. PCT/IB2015/001812.

*Primary Examiner* — Pamela Rodriguez
(74) *Attorney, Agent, or Firm* — Withrow & Terranova, PLLC

(57) ABSTRACT

A brake arrangement including hybrid brake actuators includes pneumatic and electric brake actuators, and is designed to overcome pneumatic failures by electrical brake actuators. The pneumatic can thus be lightened and less energy consuming. In particular, only one compressed air tank can be used for all the axles.

13 Claims, 7 Drawing Sheets

(56) References Cited

U.S. PATENT DOCUMENTS

| | | |
|---|---|---|
| 2005/0029859 A1* | 2/2005 | Bensch .................... B60T 7/10 |
| | | 303/89 |
| 2007/0170774 A1* | 7/2007 | Gerum .................... B60T 13/66 |
| | | 188/140 R |
| 2009/0189438 A1 | 7/2009 | Beier et al. |
| 2011/0144855 A1 | 6/2011 | Herges et al. |

FOREIGN PATENT DOCUMENTS

| | | |
|---|---|---|
| WO | 2013093545 A1 | 6/2013 |
| WO | 2016000730 A1 | 1/2016 |

* cited by examiner

BRAKE ARRANGEMENT COMPRISING HYBRID BRAKE ACTUATORS

BACKGROUND AND SUMMARY

The present invention is directed to a braking system of a vehicle, comprising braking actuators supplied by two different sources of energy. In particular, the braking actuators hereby described may be supplied by one or more of pressurized air and electrical power. The braking system of the present invention further comprises two separate electronic control units (ECU) which allow optimizing the source of braking energy according to the running conditions of the vehicle, and more particularly, under degraded running conditions.

Pneumatic brake actuators are commonly used on industrial vehicles. For safety purpose, backup pneumatic systems and several recipients of pressurized air are necessary, which increase the global weight of the braking system. In addition, in case of failure or air leakage, the backup systems do not always allow to brake all the wheels of the vehicle. Thus, an emergency braking action may lack control.

Hybrid brake actuators are known, also called bi-energy brake actuators, which can be activated by two different sources of energy. This kind of brake actuators are for example described in WO03014588 and WO2008030204. A method of activating these brake actuators is in addition described in the patent application PCT/EP2014/001813. However, although the electrical management of the brakes may compensate some failure of the pneumatic system, the pneumatic backup system still remains in the currently used systems.

It is desirable to provide an improved brake arrangement. In particular, it is desirable to replace the pneumatic backup elements, partly or completely, by electrical elements, which allow a safe braking in case of degraded conditions. It is also desirable to optimize the size of the pneumatic system, in order to limit the weight and the overall energy consumption of the vehicle.

The braking system of the present invention comprises an electrical power supply unit, a compressed air supply unit, at least one bi-energy brake actuator, which can be activated by any one of an electrical power supply unit and a compressed air supply unit or by both, simultaneously. The braking system further comprises a first and a second electronic control unit (ECU) both supplied by the electrical power supply unit. The first ECU is connected to, and provides power to the electrical actuator of the bi-energy brake actuators. It is further connected to the electrical parking brake hand control, the brake pedal sensor module, and to one or more wheel sensors. It may further be connected to a trailer control module (TCM).

The second ECU is connected to one or more brake system modules (EBS), and the brake pedal sensor module. It controls the pneumatic activation of the bi-energy brake actuators. The second ECU controls and provides electrical power to the electronic brake system module (EBS), the brake pedal module, and optionally to the air production module (APM).

The electrical power supply unit comprises two distinct sources of electrical energy. It is electrically connected to both the first ECU and the second ECU.

The compressed air supply unit comprises an air reservoir, preferably a single air reservoir dedicated to all the brake actuators of the vehicle, including the bi-energy brake actuators. In particular, the air reservoir is connected to the front and the rear axles of the vehicle, and optionally to additional axles. The air reservoir may further be connected to pneumatic or hybrid brake actuators of a trailer or a semi-trailer. The air reservoir, or air tank, is fed with compressed air by the mean of a compressor. The compressed air supply unit may further comprise air cleaner, air desiccator, and/or any other device able to purify the air. The compressed air supply unit optionally comprises a trailer control module (TCM). The compressed air supply unit may further be connected to one or more electronic brake system module (EBS), which can be either single or double.

Some brake system elements may be connected to a high speed data bus. In particular, one or more of the power supply unit, the first and the second ECUs, the electronic brake system modules (EBS), and the trailer control module, can be connected to a vehicle data bus, which may further be connected to other sensors, such as a continuous clutch pedal sensor, one or more door switch sensors, or an accelerator pedal sensor.

Further, the first and the second ECUs are directly connected to each other through a dedicated circuit. Such a direct connection improves the management of a concomitant activation of the brake actuators with the electrical power and the pneumatic energy.

The present braking arrangement preferably comprises two bi-energy actuators, positioned on two wheels of a same axle. In an advantageous configuration, a rear axle is provided with a pair of bi-energy brake actuators, and the other axles are equipped with traditional pneumatic brake actuators. However, any other configurations are possible, including the one where all the wheels of the vehicle are equipped with a bi-energy brake actuator.

The present invention also encompasses a method of managing the bi-energy brake actuators in case of failure of the service brake system, either with the pneumatic circuit or the electrical circuit.

The invention also comprises a vehicle equipped with the braking system hereby described.

DETAILED DESCRIPTION

Figure 3:
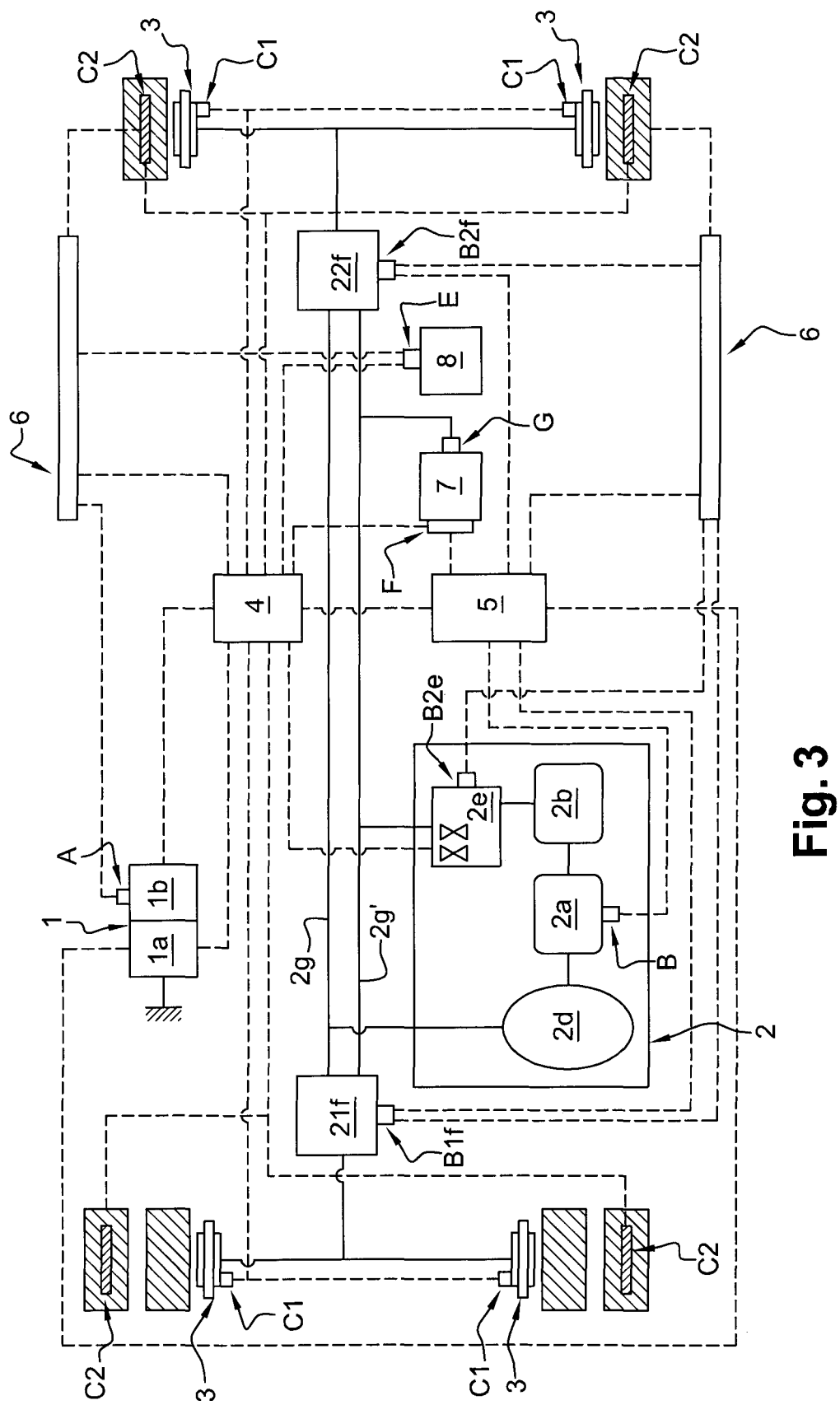
FIG. 3: General architecture of the brake system comprising bi-energy brake actuators

A general braking arrangement is described in FIG. 3. In particular; the braking arrangement of the present invention comprises:

an electrical power supply unit 1,
a compressed air supply unit 2
a brake pedal 7,
an electro mechanic parking brake handle 8, at least one bi-energy, brake actuator 3,
a first electronic control unit (ECU) 4,
a second electronic control unit (ECU) 5, The electrical power supply unit 1 comprises a first electrical power device 1a, and a second electrical power device 1b. The first and second electrical power devices may be two distinct batteries, which can be either disconnected from one another or interconnected. The two batteries are preferably connected to each other, either directly or through a DC/DC transfer module allowing the transfer of electricity from one to the other. One or both electrical power devices 1a and 1b may be fed by the electrical system of the vehicle V. The electrical system of the vehicle V can comprise an alternator driven by the vehicle engine (not shown), or can be a driving battery in case of a hybrid or electrical vehicle. One or more of the electrical power devices 1a and 1b of the power supply unit 1 may be provided with an electrical supply sensor A, which monitors the state of charge of the corresponding electrical power devices 1a and 1b and/or their ability to deliver electrical power. The electrical supply sensor A is connected to the high speed data bus 6 of the vehicle V. In such a way, a low level of electrical energy may induce a warning signal to the driver. The electrical sensor A, through the connection to the high speed data bus 6, may alternatively or in addition trigger changes of setting within the brake system. The double source of electrical power, comprising a first electrical power device 1a and a second electrical power device 1b, ensures that electrical power is always available for the brake activation. Any other configuration may be used as long as the electrical power supply unit 1 comprises two distinct sources of electrical power. For example, the first electrical power device 1a may be the main battery of the vehicle V, or an auxiliary battery, and the second electrical power device 1b may be a backup battery, exclusively dedicated to the electrical power supply unit 1. In a preferred configuration, the first electrical power device 1a is the living battery, also used for other electrical accessories of the vehicle V, and the second electrical power device 1b, used as a backup, corresponds to the cranking battery of the vehicle V.

The electrical power supply unit 1 is connected to 2 distinct ECU 4 and ECU 5. Both electrical power devices 1a and 1b are preferably connected to the first ECU 4. Only one of the two electrical power devices 1a and 1b is advantageously connected to the second ECU 5. Both power devices 1a or 1b are interconnected in such a way that electrical energy can be transferred from one to the other.

The compressed air supply unit 2 comprises an air production module (APM) 2a, which usually comprises an air distribution module (not shown) and one or more filtration modules (not shown). The air production module 2a may be provided with an air supply sensor B, which allows to determine the availability of the compressed air within the brake system. The air supply sensor B is preferably connected to the high speed data bus 6, in such a way that it can transmit information related to the available air pressure, which may be computed with other parameters monitored within the vehicle V.

The compressed air supply unit 2 further comprises a compressor 2b, which maintains the air pressure in a reservoir 2d between a cut-in and a cut-off pressure value. The reservoir 2d is preferably exclusively dedicated to the brake system of the vehicle. The other equipment of the vehicle which necessitates compressed air, such as the suspension or the gear box, may be supplied by a separate reservoir (not shown). The compressor 2d is appropriate to supply the air reservoir dedicated to the brake system with air compressed at a pressure of around 12.5 bars. The pressurized air reservoir 2d, is in fluidic connection with all the pneumatic brake actuators of the vehicle V, including the pneumatic actuators 3a of the hybrid actuators 3. In a vehicle V comprising the braking arrangement hereby described, the volume of air dedicated to the brake system may be optimized, and in particular decreased, compared to the same vehicle with a traditional pneumatic brake arrangement. Since the braking energy is provided by both pneumatic actuators 3a and electric brake actuators 3b, the amount of pressurized air necessary for braking the vehicle V is minimized compared to a traditional pneumatic brake actuator. Depending on the adopted ratio between the pneumatic energy and the electrical energy, and/or the number of hybrid brake actuators 3 within the vehicle V, the air volume dedicated to the brake system may be comprised between 120 L and 40 L. In particular, an air volume comprised between about 100 L and 60 L appears to be particularly convenient. This value is of course indicative and may easily be adapted according to the type of the vehicle. The compressed air volume of the present braking arrangement can thus be decreased with respect to the compressed air volume of a corresponding traditional pneumatic braking system by an amount equal or higher than about 10% or 20% or 50%, depending on the configuration. The present braking system also allows the downsizing of the compressor 2b accordingly.

It has to be noted that the present braking system allows still complying with the regulations. In particular, the pressure and amount of compressed air, combined with the activation of the bi-energy brake actuators, allow to brake the vehicle V according to the requirements.

The compressed air supply unit 2 supplies compressed air to the pneumatic brake actuators (3a, 10) by the mean of a pipe assembly 2g. The pressure of the air may be modulated by one or more electronic brake system (EBS) modules (21f, 22f) or brake pressure modulators, which distributes and regulates the air pressure to the pneumatic brake actuators (3a, 10). Each electronic brake system module 21f, 22f is preferably dedicated to one axle of the vehicle V. It allows to modulate the pressure level delivered to the brake actuators of an axle. In particular, the air pressure delivered to a rear axle is managed by a first electronic brake system (EBS) module 21f, and the air pressure delivered to a front axle is managed by a second electronic brake system (EBS) module 22f. It is contemplated that in case the vehicle V comprises more than 2 axles, each axle may be provided with a specific electronic brake system module 2xf, wherein x denotes the axle number. Each electronic brake system module 21f, 22f may be optionally provided with a pneumatic backup circuit, or valve, in order to circumvent or overcome potential defects. Each of the electronic brake system module may be single, meaning that it distributes the same air pressure to both brake actuators of an axle, or double, in such a way that air pressure may be different for two opposite wheels of an axle. Either single or double, the electronic brake system modules may further be provided with ABS valves. In the frame of the present brake arrangement, an EBS module 21f, 22f connected to an axle wherein the wheels are equipped with a bi-energy brake actuator 3, is advantageously a single EBS module. Also, where an axle is equipped with a pair of bi-energy brake actuators 3, the corresponding electronic braking system module is advantageously without pneumatic backup valve. Alternatively or in addition, an EBS module does not comprise ABS valves if it relates to an axle wherein the wheels are provided with a bi-energy actuator 3. Thus, in a preferred arrangement, the EBS module or modules related to an axle or axles comprising bi-energy brake actuators 3 are single, without pneumatic backup valve, and without ABS valves, and the EBS module or modules related to axles equipped with traditional pneumatic brake actuators 10 comprise one or more of a backup valve, and ABS valves.

In another preferred arrangement, the EBS module or modules related to an axle or axles comprising bi-energy brake actuators 3 are single, without pneumatic backup valves, and without ABS valves, and the EBS module or modules related to axles equipped with traditional pneumatic brake actuators 10 are double EBS.

It should be noted that the present braking arrangement is not limited to one specific configuration. It may for example comprise a combination of one or more double EBS modules and single EBS modules, wherein any one of double or single EBS module may or may not, comprise pneumatic backup valves, or ABS valves.

The electronic brake system modules 21f and 22f, may be each provided with the corresponding pneumatic pressure sensors B1f and B2f, which allow to determine the pressure level distributed to the brake actuators. Each of the electronic brake system module 21f, 22f is preferably connected to a high speed data bus 6, to transmit information related to the air pressure monitored by the pressure sensors B1f and B2f. Discrepancies between the air pressure values monitored by the air supply sensor B and one or more of the pressure sensors B1f or B2f may thus be identified through the computation of the data transmitted to the high speed data bus 6. In case of divergent pressure measurements, the corresponding electrical brake actuators 3b may be suitably activated or over-activated, by the mean of the electrical power supply unit 1.

The electronic brake system modules 21f and 22f can be directly connected to the second ECU 5. Alternatively, the electronic brake system modules 21f, 22f, communicate with the second ECU 5 through the high speed data bus 6.

In addition, the compressed air supply unit 2 may optionally contain a trailer control module (TCM) 2e, comprising a pressure sensor B2e. The trailer control module 2e is supplied in compressed air by the compressor 2b. When present, the TCM 2e is preferably directly connected to the first ECU 4. The TCM 2e may alternatively be connected to the high speed data bus 6 of the vehicle V.

The compressor 2b feeds the reservoir 2d and the TCM 2e, if any, with compressed air, by the mean of dedicated pipes assembly 2g. The pipe assembly 2g further allows fluidic connection between the reservoir 2d and the pneumatic brake actuators (3a, 10). The pipe assembly may supply one or more EBS modules (21f, 22f). The reservoir 2d is therefore in fluidic connection with all the brake actuators of the vehicle V, including the bi-energy brake actuators 3. In particular, a single compressed air reservoir 2d supplies air to the front brake actuators as well as to the rear brake actuators of the vehicle V, and any potential brake actuators of additional axles. On optional pipe assembly 2g' may be arranged to provide a pneumatic backup line. For example, the backup line 2g' can be connected to the TCM 2e, if any, or directly to the compressor 2b, to supply compressed air to the pneumatic brake actuators (3a, 10). The backup pipe assembly 2g' can further be in fluidic connection with the brake pedal and one or more EBS modules (21f, 22f).

The wheels of the vehicle V, including the wheels equipped with the hybrid brake actuators 3 may be provided with a wheel speed sensor C2, designed to monitor the speed of rotation of the wheels. The wheel speed sensors C2 are preferably directly connected to the first ECU 4. The sensors C2 may alternatively be connected to the high speed data bus 6.

The present braking system may further comprise an electro mechanic parking brake (EPB) handle 8 provided with a sensor E. The sensor E allows to determine the position of the park brake handle 8 and activate the park brakes accordingly. The sensor E may be directly connected to the first ECU 4 or to the high speed data bus 6 of the vehicle V.

The braking system of the present invention further comprises an electromechanical braking pedal 7, provided with a brake pedal sensor module F, comprising 2 sensors (not shown), both involved in the determination of the brake pedal position. The brake pedal sensor module F is directly connected to both the first ECU 4, and second ECU 5. The brake pedal 7 is advantageously not provided with a pneumatic backup connection. In other words, the air pipe assembly 2g, do not supply compressed air to the brake pedal system.

Above and below, the terms "directly connected" should be understood as a direct connection between two separate elements, which allows to exchange electrical power as well as information. Such a direct connection allows a fast communication between the connected elements. Elements which are "directly connected" may optionally further be connected through the high speed data bus 6.

The first ECU 4 is mainly dedicated to the control and activation of the bi-energy actuators 3 through the electrical actuators 3b, whereas the second ECU 5 is mainly involved in the control and activation of the pneumatic brake actuators, including the pneumatic brake actuators 3a of the bi-energy brake actuators 3. The first ECU 4 is therefore preferably connected to the electrical brake actuators 3b of the bi-energy brake actuators 3, to the sensors C1, C2, F and E. ECU 4 may further be connected to the TCM 2e. The second ECU 5 is preferably connected to the pneumatic actuator 3a, to other traditional pneumatic actuators 10, if any, to the electronic brake systems modules 21f and 22f, and to the brake pedal sensor module F. ECU 5 is optionally connected to the air production module 2a. The first ECU 4, and the second ECU 5 are advantageously interconnected, in such a way that they can directly exchange information. In addition, one or both ECU 4 and ECU 5 can be connected to the high speed data bus 6 of the vehicle V.

The first ECU 4 and the second ECU 5 are both connected to the brake pedal 7 through the brake pedal sensor module F. In such a way, the brake activation, through the brake pedal depression, activates both ECUs 4 and 5 and thus, the activation of the brake actuators 3 potentially with both electrical energy and pneumatic energy. Depending on the running conditions, the relative power of the electrical actuator 3b and the pneumatic actuator 3a on the brake caliper 3c may be optimized. The inter-connection of the first ECU 4 and the second ECU 5 may be convenient to adapt the electrical power of the electric brake actuator 3b and the pneumatic force of the pneumatic brake actuator 3a to each other. The activation of the non-hybrid brake actuators, like the traditional pneumatic brake actuators 10, through the brake pedal 7, is performed through the second ECU 5, using exclusively the pneumatic energy.

Above and below, the terms "bi-energy brake actuator" means a hybrid brake actuator which is activated by 2 different energies selected from the pneumatic energy, the hydraulic energy and the electric energy. The bi-energy brake actuator of the present invention is preferably activated by electric energy or pneumatic energy or a combination of both electric and pneumatic energies simultaneously.

Figure 1:
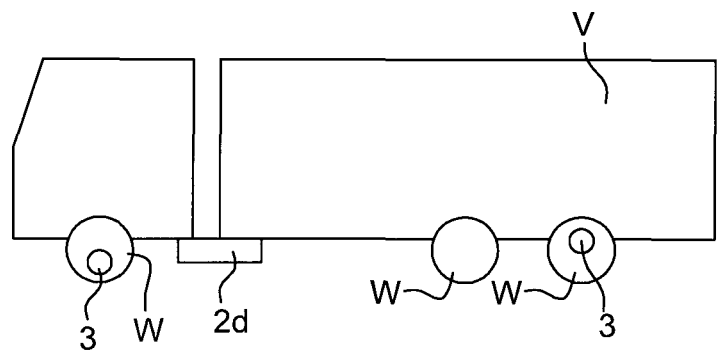
FIG. 1: example of a truck comprising bi-energy brake actuators
Figure 2:
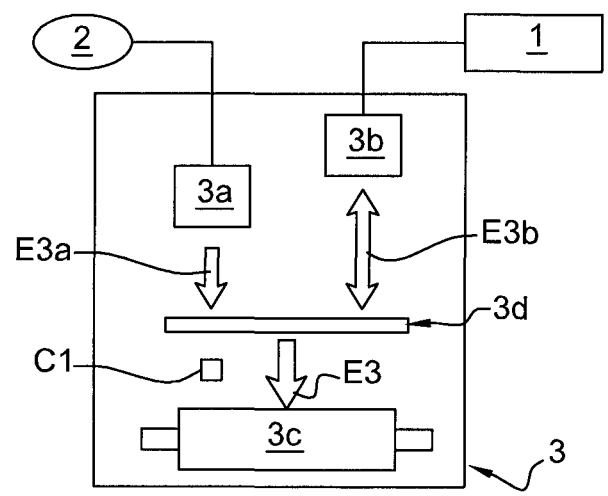
FIG. 2: Scheme of a bi-energy brake actuator

The braking arrangement of the present invention comprises at least a pair of bi-energy brake actuators 3. The pair of bi-energy brake actuators 3 may be on a front axle or on a rear axle. Several axles, such as one front and one rear axle of the vehicle V, may be provided with a pair of bi-energy brake actuators 3, as shown on FIG. 1. It is also possible that all the axles of the vehicle V are provided with a pair of the hybrid actuators 3.

The bi-energy brake actuator 3 is preferably the brake actuator described in the patent application PCT/EP2014/001813. In particular, each "bi-energy" brake actuator 3 of the vehicle V includes a pneumatic brake actuator 3$a$ and an electric brake actuator 3$b$ that can act both on a brake caliper 3$c$. More precisely, the pneumatic brake actuator 3$a$ and the electric brake actuator 3$b$ generate respectively an effort E3$a$ and E3$b$ that can be applied on a transfer module 3$d$. E3$a$ denotes the effort transmitted via the transfer module 3$d$ to the brake caliper 3$c$. E3 is the sum of the efforts E3$a$ and E3$b$, which means that the transfer plate 3$d$ allows adding up the efforts delivered by the actuators 3$a$ and 3$b$. The electric brake actuator 3$b$ is preferably not reversible, or bi-stable, which means that it needs energy to be withdrawn. That is materialized by the double-headed arrow E3$b$, showing the action of the electric brake actuator 3$b$ on the brake caliper 3$c$. A piston position sensor C1 may be provided to determine the position of the brake piston of each bi-energy actuator. A piston position sensor C1 may also be present on the traditional pneumatic brake actuators 10. Each electric brake actuator 3$b$ is powered by the electric power supply unit 1 of the vehicle V. Each pneumatic brake actuator 3$a$ is supplied with compressed air that is delivered by the compressed air supply unit 2. In case of a vehicle train comprising a truck and at least one trailer, brake actuators of the truck and of the trailer, are at least powered with compressed air delivered by the compressed air supply unit 2.

It is contemplated that, under normal running conditions, the bi-energy brake actuators 3 are activated by both electrical actuators 3$b$ and pneumatic actuators 3$a$ simultaneously. The "normal running conditions" should be understood as non-failure conditions, or safe conditions, wherein the braking system does not suffer from any defect. Under these circumstances, the bi-energy brake actuators 3 receive a part of the brake power from the compressed air supply unit 2 and the remaining brake power from the electrical actuator 3$b$. In this configuration, the compressed air supply unit 2 may be downsized, compared to a traditional pneumatic system, as mentioned above.

Alternatively, the bi-energy brake actuators 3 may be activated only by the compressed air supply unit 2, for smooth braking phases under normal conditions, and activated by both pneumatic brake actuators 3$a$ and electric brake actuator 3$b$ if more braking power is required. In particular, slowing down the vehicle, in absence of immediate danger, may be performed only with the pneumatic energy. Complementary energy may be provided by the electrical power if the brake pedal 7 is further pressed. Under these conditions, the compressed air supply unit 2 may be downsized, compared to the traditional pneumatic systems, as mentioned above.

Figure 4:
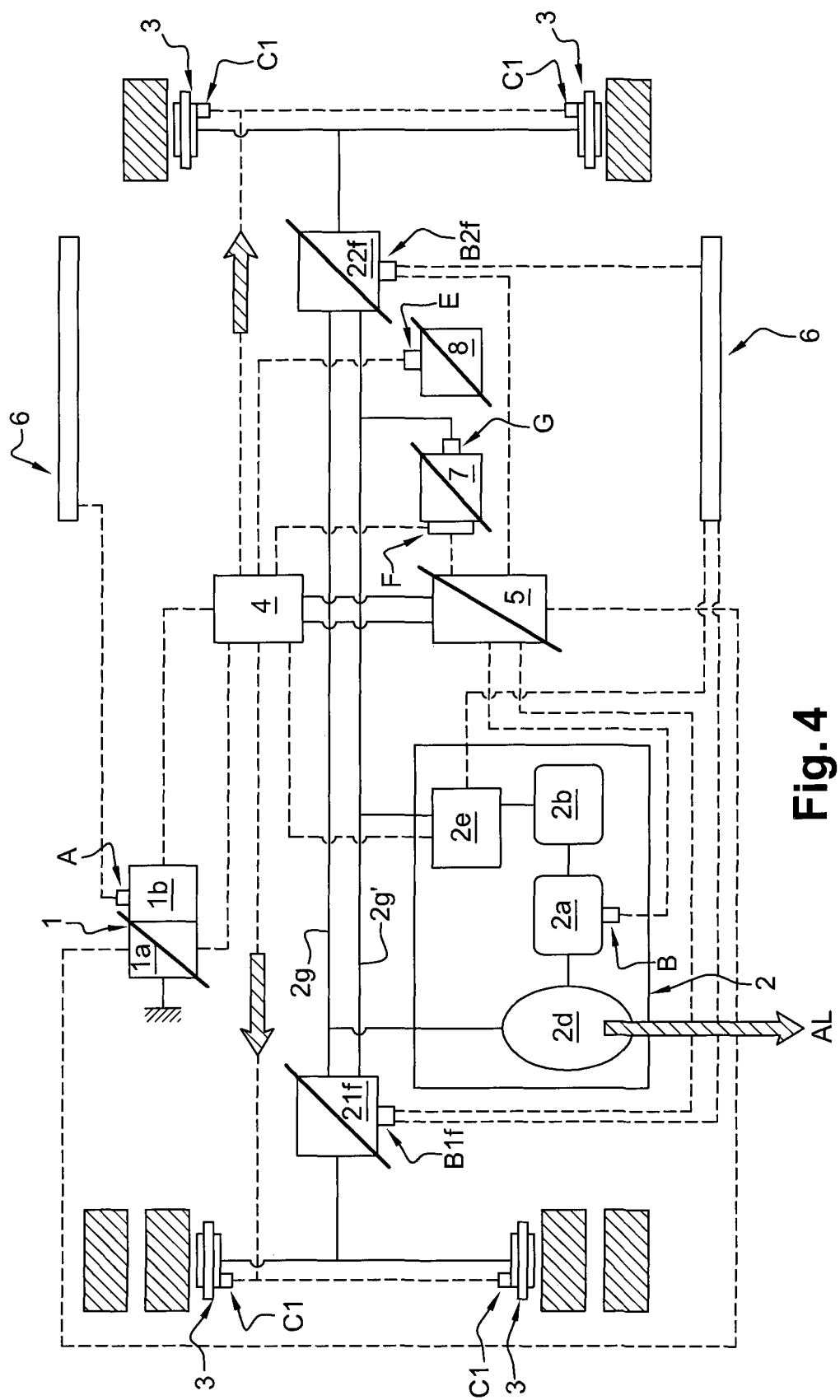
FIG. 4: examples of failure circumvented by the brake arrangement comprising bi-energy brake actuators

It is also contemplated that the electrical actuators 3$b$ is activated or over-activated in case of failure of the brake system. Failure of the brake system includes in particular air leakage AL, default of one or the other ECUs 4 and 5, default of the brake pedal 7 or its brake pedal sensor module F, default of the parking brake handle 8 or its sensor E. However, the above defaults are not an exhaustive list, and other failures may occur that can be compensated thanks to the electrical redundancy of the present brake arrangement. FIG. 4 will explain in more details how the brake failures can be circumvented.

The braking system may be arranged according to various preferences, with various degrees of redundancy between the electrical circuit and the pneumatic circuit, depending on the expected safety level. In particular, any pneumatic backup element of the braking system may be either replaced by a corresponding electric element, or doubled by such an electric element. Further, each pneumatic element which comprises several functions may be simplified, if some of the corresponding functions are operated by the electric brake actuation.

Thanks to the brake arrangement of the present invention, several failures may be overcome, as depicted in FIG. 4. In case the failure consists in a lack of air pressure, the electric brake actuators 3$b$ may be activated, or over-activated, in such a way that the wheels equipped with a hybrid brake actuator 3 receive the proper braking force. The lack of pressure may be due to an air leakage AL within the pneumatic circuit, or default of the compressor 2$b$, or because of trouble elsewhere within the compressed air supply unit 2. The air supply sensor B or one or more of the pneumatic sensors B1$f$ and B2$f$ may detect the air pressure default and communicate it to the second ECU 5. Thanks to the interconnection between the first ECU 4 and the second ECU 5, a rapid change in the brake settings may occur, that allow to activate or overactivate the electric brake actuators 3$b$. Alternatively the failure information may be transmitted through the high speed data bus 6 of the vehicle.

In this context, the terms "over-activated" means that the part of the braking power coming from the electrical actuators 3$b$ is increased with respect to the normal conditions. Where the normal conditions are such that only the pneumatic energy is used to brake the vehicle V, then the brake actuators 3 may be simply "activated" through the electrical actuators 3$b$ in case of failure. The activation or over-activation of the electrical actuators 3$b$ may provide a braking three complementary to the pneumatic braking force or the complete braking force. In the last case, the electric brake actuators 3$b$ should be designed in such a way to provide enough braking power to stop the vehicle V.

The braking power provided by the electrical actuators 3$b$ may be adapted to the load status of the vehicle for each wheel. In particular, the sensors C1 and C2 allow to adapt the braking force of each electrical actuator 3$b$ according to the speed of rotation of the corresponding wheel.

In case the failure comes from the second ECU 5, as mentioned by the corresponding cross bar in FIG. 4, the braking signal may not be transmitted from the brake pedal 7 to the EBS modules 21$f$ and 22$f$. Under these circumstances, the first ECU 4 takes the lead and induces the activation or the over-activation of the electrical brake actuators 3$b$. As above described, each wheel of the vehicle V equipped with such a bi-energy brake actuator 3 is independently controlled and can be individually managed by the mean of the corresponding sensors C1 and C2.

If the brake pedal 7 or its sensor module F fails, as shown in the corresponding cross bar in FIG. 4, then the parking brake handle 8 can still be used to activate the brake actuators 3, through ECU 4. Thus, the brake will be activated through the electric brake actuator 3$a$.

In case only one of the two brake pedal sensors, comprised in the brake pedal sensor module F, is out of order, no failure mode may be initiated. However, an alert message may be delivered to the driver.

In case of failure within the park brake 8 handle or its sensor E, the backup braking effect may be provided by the braking pedal 7. Alternatively, an automatic mode may be provided, to automatically apply and automatically release the parking brake actuators.

In case the power supply unit 1 is out of order despite the 2 distinct power supply devices 1*a* and 1*b*, none of the first ECU 4 and the second ECU 5 can be activated. However, the pneumatic backup pipe assembly 2*g*' may provide the necessary braking energy to stop the vehicle V.

Exemplified specific brake arrangements are provided here below for illustrative purpose. The following examples are not intended to limit the scope of the present invention to those specific arrangements. Although FIGS. 5 to 8 show a vehicle with 2 axles, the brake arrangement of the present invention may be applied to vehicle having more than 2 axles, like for example one front axle and 2 rear axles, or 2 front axles and 2 rear axles. In that case, any additional axle may or may not be equipped with bi-energy brake actuators 3.

Figure 5:
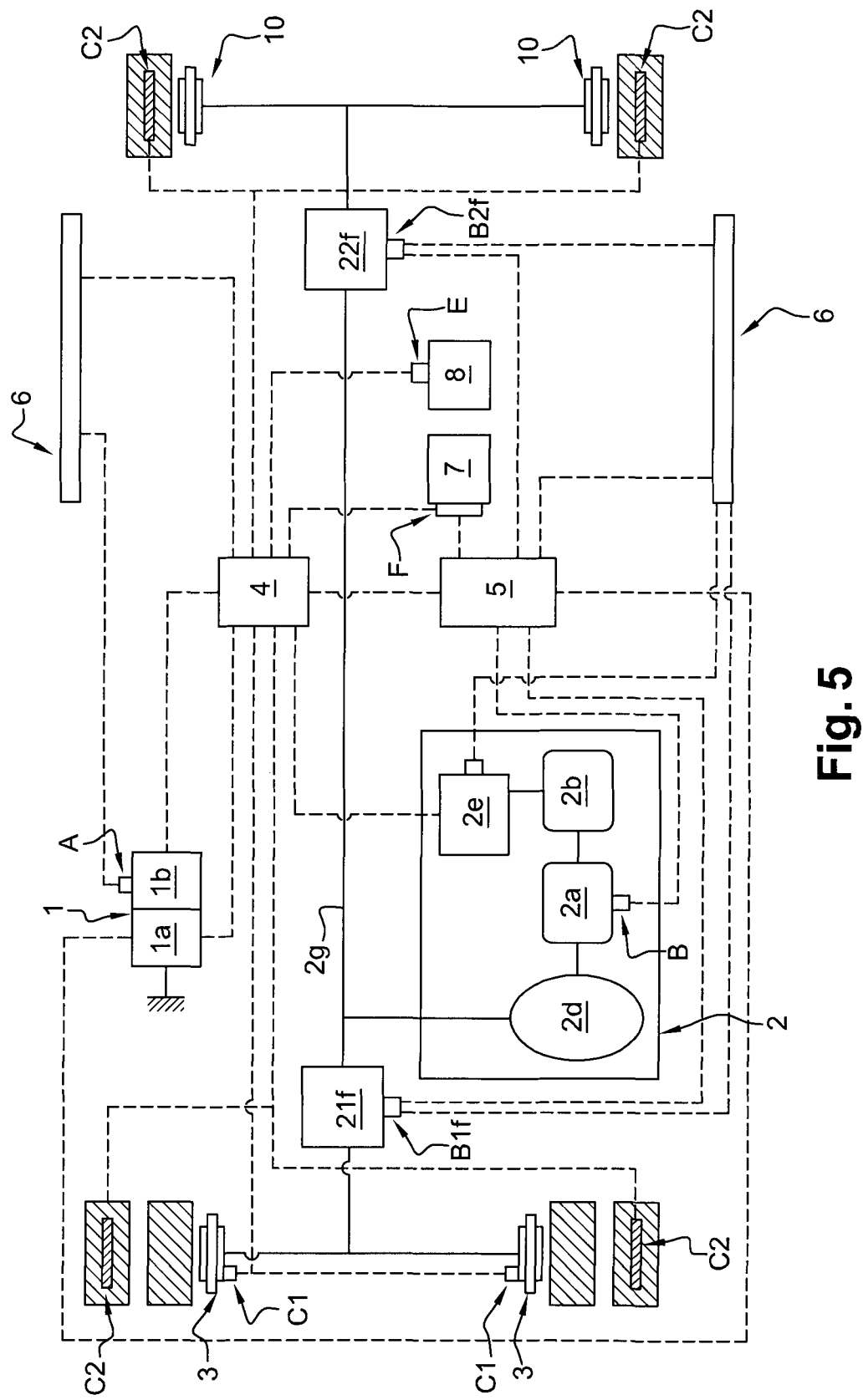
FIG. 5: example of a first specific brake arrangement

A first example corresponds to FIG. 5, wherein the braking arrangement or system o comprises:

A power supply unit 1 with at least 2 power supply devices 1*a* and 1*b*.

a pair of hybrid brake actuators 3 at a rear axle, each brake actuator 3 comprising a pneumatic brake actuator 3*a* and an electrical brake actuator 3*b*, a pair of traditional pneumatic actuators 10 at other axles, like a front axle and optionally any additional rear axles, a compressed air supply unit 2, comprising a common air reservoir 2*d* which feeds the hybrid brake actuators 3 of the rear axle, as well as the traditional brake actuators 10 of the other axles through a pipe assembly 2*g*, an optional electric TCM 2*e* and being in fluidic connection with an EBS module 21*f* at the rear axle and an EBS module 22*f* at a front axle, wherein both EBS modules 21*f*, 22*f* are simple EBS modules, without pneumatic backup valve, wherein the brake arrangement further comprises a brake pedal 7, having a brake pedal sensor module F, and wherein the pneumatic backup is absent, an electro mechanic parking brake handle 8, comprising a sensor E, at least one wheel sensor C2, a first ECU 4, supplied by the power supply unit 1, and connected to both electric brake actuators 3*b* of the rear axle, to the optional TCM 2*e*, to the brake pedal sensor module F of the brake pedal 7, to the sensor E of the park brake handle 8, and further connected to at least the wheel sensors C2 of the wheels equipped with a bi-energy actuator 3, and to the piston position sensor C1 of the bi-energy actuators 3.

a second ECU 5, supplied by the power supply unit 1, and connected to the front EBS module 22*f* and to the rear EBS module 21*f*, to the brake pedal sensor module F of the brake pedal 7, and optionally connected to the APM 2*a*.

The reservoir 2*d* of the compressed air supply unit 2 has advantageously a reduced volume compared to a traditional pneumatic brake system. Also, the compressor 2*b* may be downsized as described above. The compressed air supply unit 2 does not feed the brake pedal 7 with compressed air. In other words, there is no pneumatic back up system related to the brake pedal 7 but only an electrical back up system.

Both supply unit 1*a* and 1*b* are preferably connected to the ECU 4 and ECU 5. Alternatively, both power supply devices 1*a* and 1*b* may be connected to the ECU 4 and only one of the power supply device 1*a* or 1*b* is connected to the ECU 5.

Figure 6:
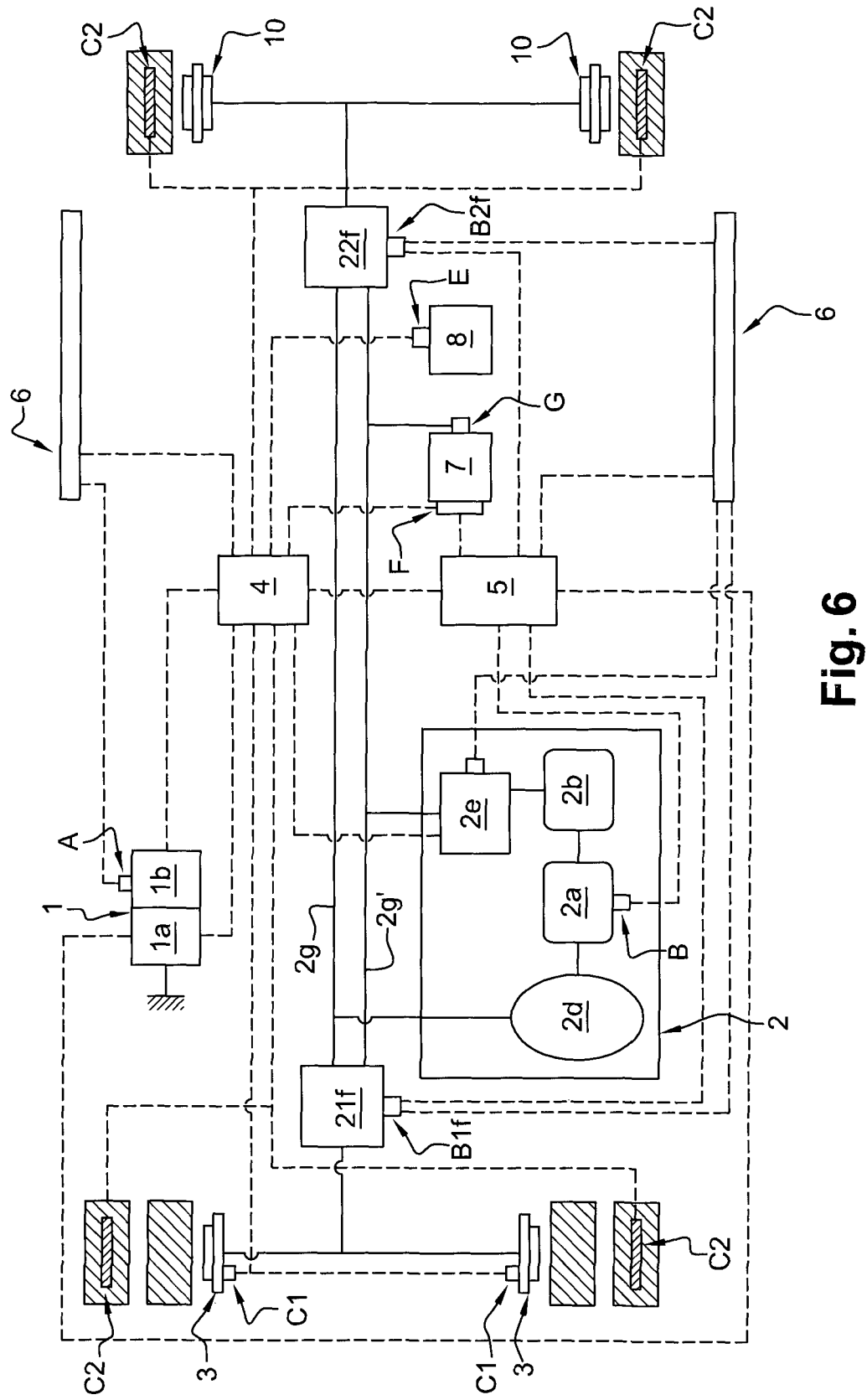
FIG. 6: example of a second specific brake arrangement

A second example is depicted in FIG. 6. The brake arrangement comprises, in addition to the previous example, a pneumatic backup line which feeds the brake pedal 7 by the mean of a backup valve G, and one or more of the EBS module 21*f*, 22*f*. According to this configuration, the EBS module of the front axle 22*f*, and the brake pedal 7, are supplied through a pneumatic backup pipe assembly 2*g*'. In other words, the braking arrangement of this second example comprises:

A power supply unit 1 with at least 2 power supply devices 1*a* and 1*b*.

a pair of hybrid brake actuators 3 at a rear axle, each brake actuator 3 comprising a pneumatic brake actuator 3*a* and an electrical brake actuator 3*b*, a pair of traditional pneumatic actuators 10 at other axles, like the front axle or front axles and optionally any additional rear axle, a compressed air supply unit 2, comprising a common air reservoir 2*d* which feeds the hybrid brake actuators 3 of the rear axle, as well as the traditional brake actuators 10 of the other axles, and in particular the front axle, through a pipe assembly 2*g*, an optional electric TCM 2*e*, and being in fluidic connection with an EBS module 21*f* at the rear axle and an EBS module 22*f* at the front axle, wherein both EBS modules 21*f* and 22*f* are simple EBS modules, wherein the first EBS module 21*f* at the rear axle, does not comprise a pneumatic backup valve, and wherein the second EBS module 22*f* at the front axle, does contain a pneumatic backup valve, wherein the brake arrangement further comprises a brake pedal 7, comprising a brake pedal sensor module F, and a pneumatic backup valve G, an electro mechanic parking brake handle 8, comprising a sensor E, at least a wheel sensor C2, A backup pipe assembly 2*g*' in fluidic connection with the reservoir 2*d*, the pneumatic backup valve G of the brake pedal 7 and the EBS modules 21*f*, 22*f* a first ECU 4, supplied by the power supply unit 1, and connected to both electric brake actuators 3*b* of the rear axle, to the optional TCM 2*e*, to the brake pedal sensor module F of the brake pedal 7, to the sensor E of the park brake handle 8, and further connected to at least the wheel sensors C2 of the wheels equipped with a bi-energy actuator 3, and to the piston position sensor C1 of the bi-energy actuators 3.

a second ECU 5, supplied by the power supply unit 1, and connected to the front EBS module 22*f* and to the rear EBS module 21*f*, to the brake pedal sensor module F of the brake pedal 7, and optionally connected to the APM 2*a*.

According to this configuration, all the wheels can still be brakes in case of a failure of the power supply unit 1, as explained above.

Figure 7:
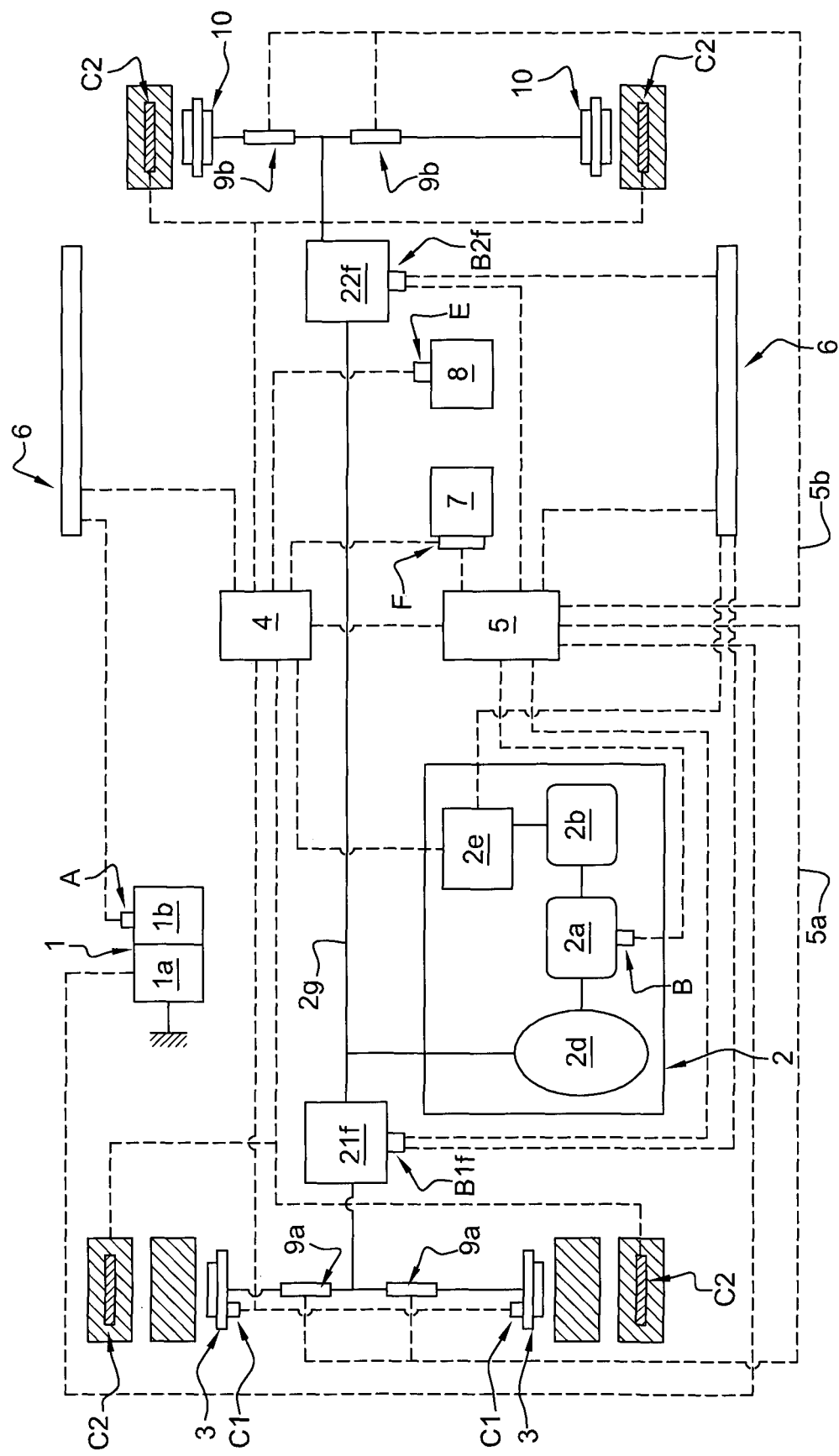
FIG. 7: example of a third specific brake arrangement

A third example is shown in FIG. 7, wherein additional ABS valves 9*a*, 9*b* are added either on a rear axle or on a front axle, or both of them. Such an arrangement may comprise for example:

A power supply unit 1 with at least 2 power supply devices 1*a* and 1*b*, a pair of hybrid brake actuators 3 at a rear axle, each brake actuator 3 comprising a pneumatic brake actuator 3*a* and an electrical brake actuator 3*b*, a pair of traditional pneumatic actuators 10 at the other axles, including a front axle and optionally any additional rear axles, a compressed air supply unit 2, comprising a common air reservoir 2d which feeds the hybrid brake actuators 3 of the rear axle, as well as the traditional brake actuators 10 of the other axles, and in particular the front axle, through a pipe assembly 2g, an optional electric TCM 2e, and being in fluidic connection with an EBS module 21f at the rear axle and an EBS module 22f at the front axle, wherein both EBS modules are simple EBS modules, without pneumatic backup valve.

2 ABS valves 9b on the front axle and optionally 2 ABS valves 9a on the rear axle, Wherein the brake arrangement further comprises a brake pedal 7, comprising a brake pedal sensor module F, without pneumatic backup, an electro mechanic parking brake handle 8, comprising a sensor E, at least one wheel sensor C2, a first ECU 4, supplied by the power supply unit 1, and connected to both electric brake actuators 3b, to the optional TCM 2e, to the brake pedal sensor module F of the brake pedal 7, to the sensor E of the park brake handle 8, and further connected to at least the wheel sensors C2 of the wheels equipped with a bi-energy actuator 3, and to at least the piston position sensor C1 of the bi-energy actuators 3.

a second ECU 5, supplied by the power supply unit 1, and connected to the front EBS module 22f and to the rear EBS module 21f, to the brake pedal sensor module F of the brake pedal 7, to the pairs of pneumatic ABS valves 9a, 9b, and optionally connected to the APM 2a.

Figure 8:
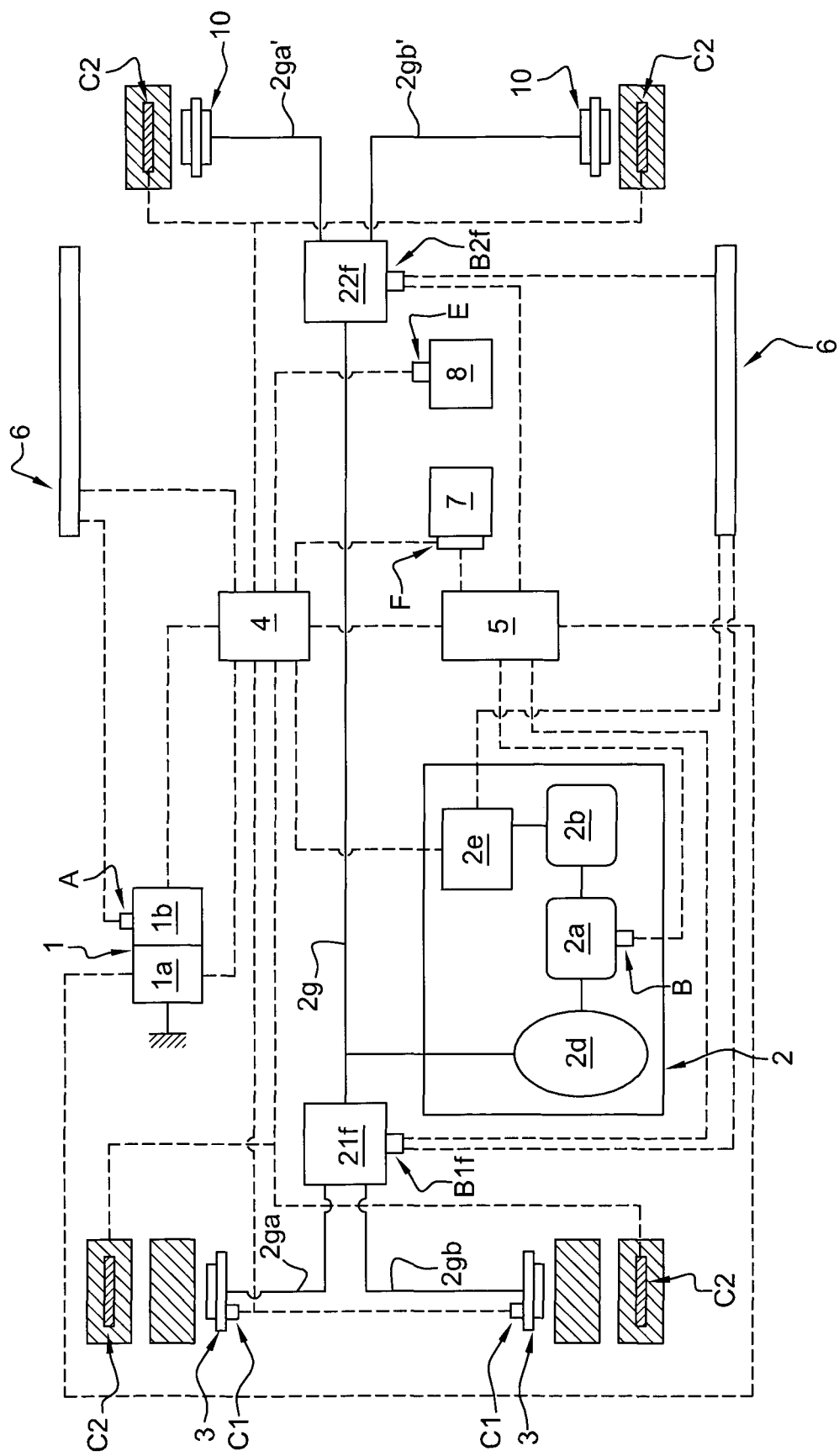
FIG. 8: example of a fourth specific brake arrangement In FIGS. 3, 4, 5, 6, 7, and 8, the connections which are represented by plain lines correspond to fluidic connections, and in particular to pneumatic connections. The connections represented by dotted lines correspond to electrical connections. Such electrical connections indicate the transmission of electrical power or information, or both.

A fourth configuration is drawn in FIG. 8, wherein the brake arrangement comprises one or more double electronic brake system modules 21f, 22f instead of simple ones. In particular, such an arrangement may comprise:

A power supply unit 1 with at least 2 power supply devices 1a and 1b, a pair of hybrid brake actuators 3 at a rear axle, each brake actuator 3 comprising a pneumatic brake actuator 3a and an electrical brake actuator 3b, a pair of traditional pneumatic actuators 10 at other axles, including a front axle and optionally any additional rear axles, a compressed air supply unit 2, comprising a common air reservoir 2d which feeds the hybrid brake actuators 3, as well as the traditional brake actuators 10 of the other axles, and in particular the front axle, through a pipe assembly 2g, an optional electric TCM 2e, and being in fluidic connection with an EBS module 21f at the rear axle and an EBS module 22f at the front axle, wherein both EBS modules 21f and 22f are double EBS modules, without pneumatic backup valve, wherein the brake arrangement further comprises a brake pedal 7, comprising a brake pedal sensor module F, without pneumatic backup, an electro mechanic parking brake handle 8, comprising a sensor E, at least a wheel sensor C2, Separate air pipes 2ga', 2gb' at the front axle and optionally separate pipes 2ga and 2gb at the rear axle.

a first ECU 4, supplied by the power supply unit 1, and connected to both electric brake actuators 3b, to the TCM 2e, to the brake pedal sensor module F of the brake pedal 7, and to the sensor E of the park brake handle 8, and further connected to at least the wheel sensors C2 of the wheels equipped with a bi-energy actuator 3, and at least to the piston position sensor C1 of the bi-energy actuators 3 a second ECU 5, supplied by the power supply unit 1, and connected to the front EBS module 22f and to the rear EBS module 21f, to the brake pedal sensor module F of the brake pedal 7, and optionally connected to the APM 2a.

It is also contemplated a combination of the above exemplified arrangements. For example, a brake arrangement according to the present invention may combine a backup pipe assembly 2g', feeding the brake pedal 7 and one or more of the electronic brake system module 21f, 22f, with 2 or more pairs of ABS valves 9a,9b. A backup pipe assembly 2g', as described above, may alternatively be combined with one or more double electronic brake system modules 21f, 22f.

A braking method is also part of the present invention wherein pneumatic brake actuators (3a, 10) and electric brake actuators 3b are both activated, and wherein the electric brake actuators 3b are over activated in case of failure of the pneumatic brake system. In particular, partial or total braking force can be provided with bi-energy brake actuators 3b. The braking method comprises the steps of:

activating the pneumatic brake actuators (3a, 10), activating the electric brake actuators 3b detecting a failure within the pneumatic brake system over-activating the electric brake actuators 3b.

The steps a) and b) may be concomitant or sequential. The method above described is particularly convenient when failure is selected from an air leakage, default of the ECU 4 and/or 5, default of the brake pedal 7 or its pedal sensor module F, default of the parking brake handle 8, or its sensor E, default of one or more of the EBS modules 21f, 22f.

The invention claimed is:

1. A braking arrangement for a vehicle, comprising:
an electrical power supply unit comprising two separate power supply devices,
a compressed air supply unit, comprising an air reservoir, and a trailer control module (TCM), and being in fluidic connection with one or more electronic brake system modules,
a brake pedal comprising a brake pedal sensor module,
an electro mechanic parking brake handle comprising a sensor,
at least one wheel sensor,
at least one bi-energy brake actuator comprising a pneumatic brake actuator and an electric brake actuator, the at least one bi-energy brake actuator being activated by one or more of the electrical power supply unit and the compressed air supply unit, and
a first braking system control unit (first ECU), and a second braking system control unit (second ECU),
wherein the first ECU is supplied by the electrical power supply unit and is connected to the at least one bi-energy brake actuator, the TCM, the brake pedal sensor module, and the at least one wheel sensor,
the second ECU is supplied by the electrical power supply unit and is connected to the one or more electronic brake system modules, and the brake pedal sensor module, and
the two separate power supply devices are each configured to supply the first ECU, the second ECU, and the at least one bi-energy brake actuator.

2. The braking arrangement according to claim 1, wherein the air reservoir of the compressed air supply unit is in fluidic connection with pneumatic brake actuators of all axles of the vehicle, including pneumatic brake actuators of front axles, and pneumatic brake actuators of rear axles.

3. The braking arrangement according to claim 1, wherein at least one of the power supply devices is equipped with an electrical supply sensor.

4. The braking arrangement according to claim 1, wherein the vehicle comprises a plurality of axles including a rear axle, one pair of bi-energy brake actuators at the rear axle, and traditional pneumatic brake actuators at other axles.

5. The braking arrangement according to claim 1, wherein the one or more electronic brake system modules are single electronic brake system modules.

6. The braking arrangement according to claim 1, further comprising a backup pipe assembly, and wherein the brake pedal comprises a backup valve.

7. The braking arrangement according to claim 1, further comprising a pair of ABS valves on at least one axle.

8. The braking arrangement according to claim 7, wherein the pair of ABS valves is provided on the front axle.

9. The braking arrangement according to claim 1, wherein one or more of the one or more electronic brake system modules are double electronic brake system modules.

10. The braking arrangement according to claim 9, wherein an electronic brake system module of a rear axle is a single electronic brake system module and wherein an electronic brake system module of a front axle is a double electronic brake system module.

11. A braking method for the braking arrangement of claim 1, comprising the steps of
    activating the pneumatic brake actuator,
    activating the electric brake actuator with either or both of the two separate power supply devices,
    detecting a failure within the pneumatic brake actuator, and
    over-activating the electric brake actuator.

12. The braking method according to claim 11, wherein the failure is selected from an air leakage, default of the first and/or second ECU, default of the brake pedal or the break pedal sensor module, default of the electro mechanic parking brake handle or the sensor of the electro mechanic parking brake handle, and default of the one or more electronic brake system modules.

13. The vehicle of claim 1, comprising at least one wheel equipped with the bi-energy brake actuator, comprising the pneumatic brake actuator and the electric brake actuator, and activated by the electrical power supply unit and the compressed air supply unit, and the braking arrangement defined in claim 1.

* * * * *